Jan. 9, 1968     H. DE FRANCE ETAL     3,363,129
COLOUR TUBE WITH TRIPLET PHOSPHOR STRIPS
MAKING 40° TO 70° ANGLE WITH HORIZONTAL
Filed Oct. 27, 1964     6 Sheets-Sheet 3
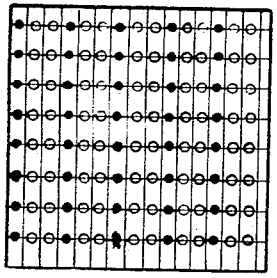
Fig:3
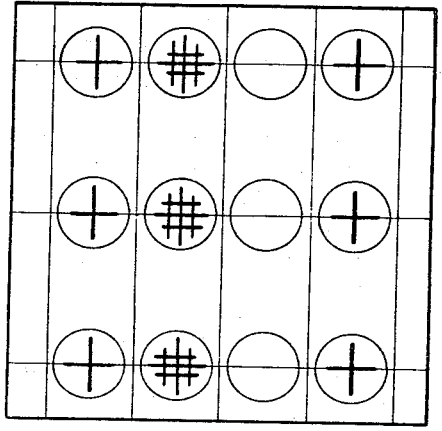
Fig:4
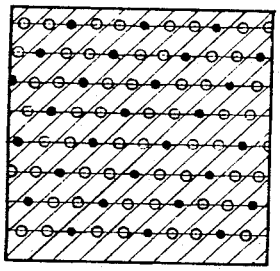
Fig:5
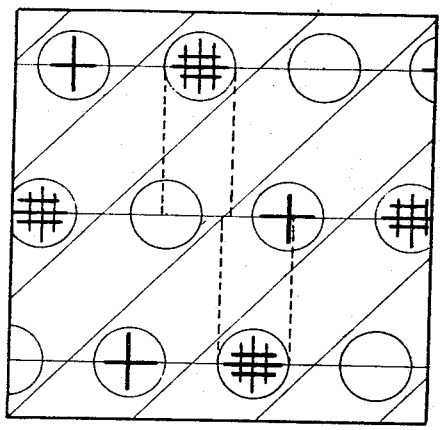
Fig:6
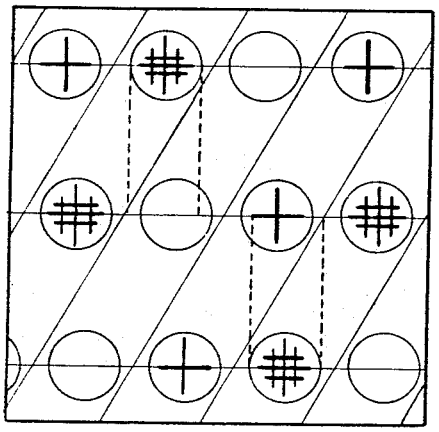
Fig:8
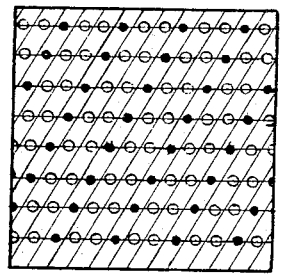
Fig:7
INVENTOR.
HENRI de FRANCE
ROGER R. CAHEN
By Kurt Kelman
agent

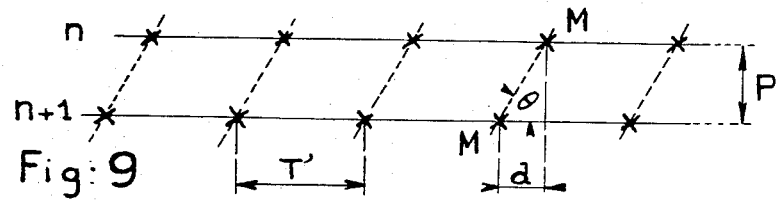
Fig: 9
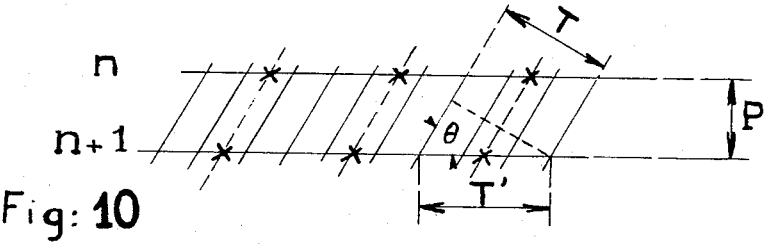
Fig: 10
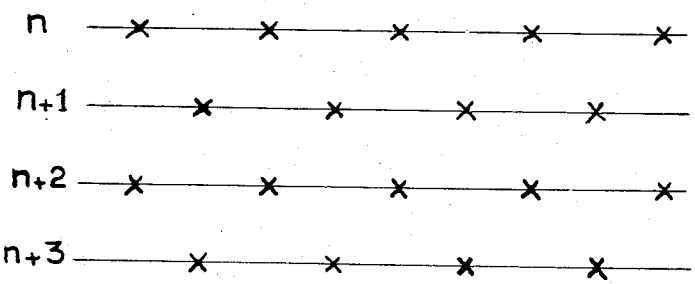
Fig: 11
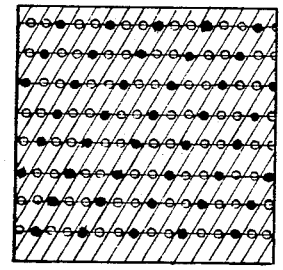
Fig: 16
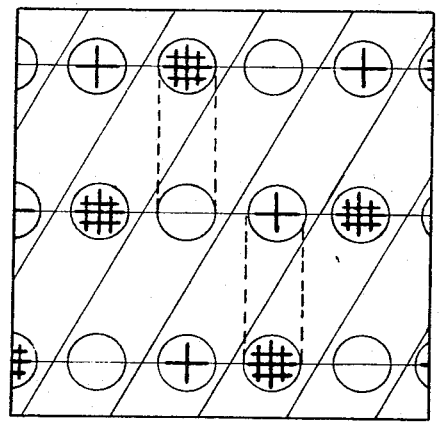
Fig: 17
INVENTORS.
Henri de France
Roger R. Cahen
By Kurt Zelman

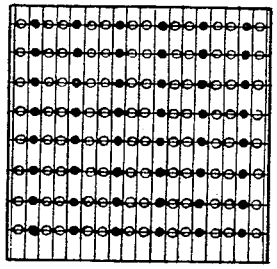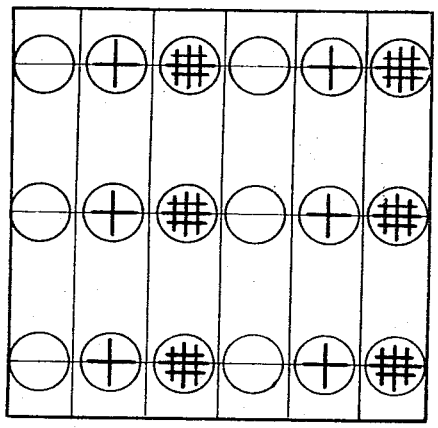
Fig:14   Fig:15
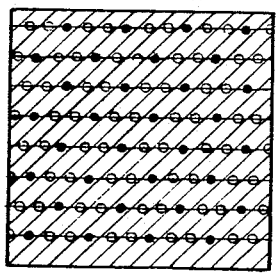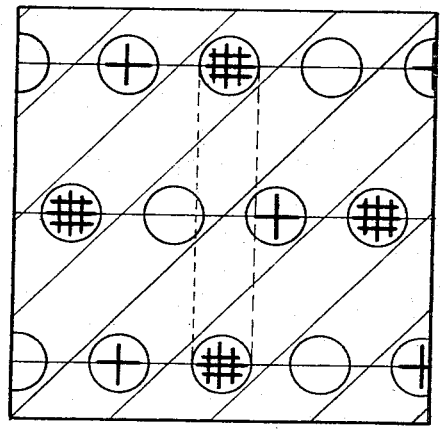
Fig:12   Fig:13
INVENTORS
HENRI de FRANCE
ROGER R. CAHEN
BY Kurt Kelman
agent

United States Patent Office 3,363,129
Patented Jan. 9, 1968

3,363,129
COLOUR TUBE WITH TRIPLET PHOSPHOR STRIPS MAKING 40° TO 70° ANGLE WITH HORIZONTAL
Henri de France and Roger R. Cahen, Levallois, France, assignors to Compagnie Francaise de Television, a corporation of France
Filed Oct. 27, 1964, Ser. No. 406,729
Claims priority, application France, Oct. 30, 1963, 952,266; July 24, 1964, 982,932
3 Claims. (Cl. 313—92)

The present invention relates to colour television receiver tubes and more particularly to three-gun tubes with luminescent strip screens.

The screen of tricolour tubes of this type possesses three groups of phosphor strips supplying respectively the luminous informations corresponding to three primary colours, generally red, blue and green.

Each of the three guns is associated with one of the three colours, that is to say that the intensity of its beam is modulated by a signal corresponding to a given colour.

The three beams are simultaneously deflected to sweep the screen along successive horizontal field lines, further means being provided for causing each beam to strike the colour elements to which it corresponds.

Among known strip type three-gun tubes, there are those with horizontal strips, i.e. strips parallel to the direction of line scanning and those whose strips are vertical, i.e. at right angles to the former.

Whatever the orientation of the strips, the actual picture supplied by the screen, which will be designated as the "objective picture," consists of three primary pictures each of which is formed of elements, which are respectively blue, green and red. The continuous coloured picture with a multiplicity of shades, which is to be offered to the viewer, can only be the result of visual integration or fusion effected by the viewer when placed sufficiently far from the screen. It is of course desirable that the subjective picture, i.e. that seen by the viewer, shall appear as a continuous coloured picture at a relatively short distance from the screen.

The tube with horizontal strips supplies an objective picture whose pattern shows clear horizontal lines, since it consists of a succession of luminous strips, red, green or blue, whose intensity varies at the rate of the information transmitted.

Technological and technical considerations (screen manufacture, focusing the spots supplied by the guns) set a lower limit, about 0.3 mm. for instance, to the strip width. The viewer has then to integrate primary colour strips whose width is of the order of magnitude of 0.3 mm.

In a vertical strip tube, the objective picture consists of columns of red, blue and green dots, the width of a column being approximately equal to that of a strip, and these columns must be integrated by the viewer.

Experience shows that, by a psychophysiological process, a viewer with normal or corrected sight separates more easily from each other parallel lines when they are horizontal or vertical than when they are oblique. This effect is due to eye education, the eye being accustomed to seeing more horizontal and vertical lines than oblique lines in its usual surroundings.

Whether the strips are horizontal or vertical, single colour alignments in the direction of the strips are easily visible from a certain viewing distance. Viewers are disturbed by such patterns, which build up in the picture arbitrary discontinuities which do not exist in the object.

There are two ways of attenuating this defect: increasing the viewing distance or increasing the number of phosphor strips per unit length. The first method causes a reduction of the viewing angle, and the second leads to the difficulties mentioned above.

A second defect in strip type tubes consists in the formation of interference patterns on the rectilinear portions of the picture parallel to the phosphor strips; this defect is particularly marked in the case of conventional strip type tubes since, as already mentioned, the horizontal and vertical lines are the most frequently observed in nature. This is readily verified with optical definition test patterns. The defect can be avoided only by increasing the number of phosphor strips.

Another drawback of conventional strip type tubes is the following: with a screen with horizontal strips, the horizontal definition provided by the screen is overabundant, whereas, for the use of the transmitted picture lines, one is restricted by small, therefore low height, screens. For example, in a conventional 625-line standard, the number of visible picture lines—i.e. of lines corresponding to the transmission of actual picture signals—is 579, corresponding to 1737 strips. Even with strips as narrow as 0.25 mm., this requires a minimum screen height of 43 cm.

With vertical strip tubes, the vertical definition supplied by the screen is overabundant, whereas trouble may be felt—still on account of the minimum width of the strips—in securing the horizontal definition allowed by the transmitted signal.

It is an object of the invention to remedy the defects mentioned above. The invention provides in addition further advantages which will be set forth further on.

According to the invention, there is provided a colour television tube comprising: a screen with parallel phosphor strips, three successive strips of said screen having respective different colours and forming a triplet, and said strips making with the horizontal direction of said screen an acute angle $\theta$; three guns, for producing three beams, respectively associated with said three colours; and means for causing said beams to sweep and screen along successive horizontal lines, so that each beam strikes the strips of the colour associated therewith.

For a better understanding of the invention and to show how the same may be carried into effect, reference will be made to the accompanying drawing, in which:

FIG. 3 shows the colour dot pattern obtained for a given ratio of the scanning line pitch to the width of the strip over a portion of the screen of a tricolour, vertical strip tube;

FIG. 4 shows the same pattern on a larger scale;

FIGS. 5 and 6 are the corrresponding figures for a screen with strips inclined at 45° to the horizontal;

FIGS. 7 and 8 are the corresponding figures for a screen with strips inclined at 60° to the horizontal;

FIGS. 9 and 10 are graphs showing the mathematical relations involved in the case of a screen with oblique strips;

FIG. 11 shows the distribution of the triads (group of three simultaneously obtained colour dots) on a screen with strips at an angle of 50° to the horizontal, the vertical period of the structure being of order 2;

FIG. 12 shows, at the same scale as in FIG. 3, the colour dot pattern on a screen with strips inclined at 45° to the horizontal, with a vertical period of order 2;

FIG. 13 is an enlargement of part of FIG. 12;

FIGS. 14 and 15 correspond to FIGS. 12 and 13 in the case of a screen with vertical strips of the same width as the oblique strips of FIGS. 12 and 13;

FIG. 16 shows, at the same scale as FIG. 3, the colour dot pattern on a screen with strips inclined at 60° to the horizontal, with a vertical period of order 3, and FIG. 17 shows the same pattern at a larger scale.

Figure 18:
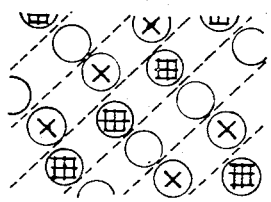
Figure 19:
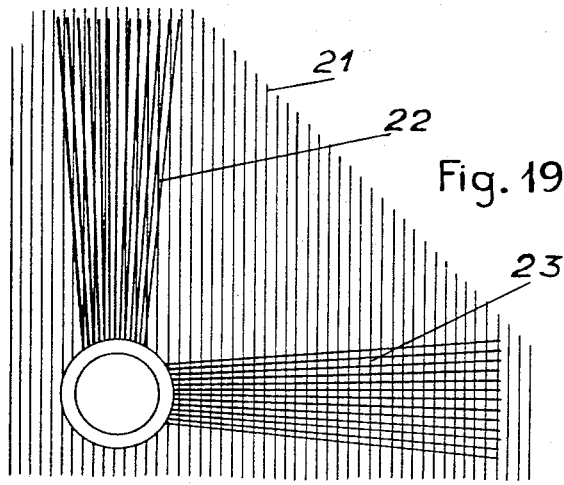
Figure 20:
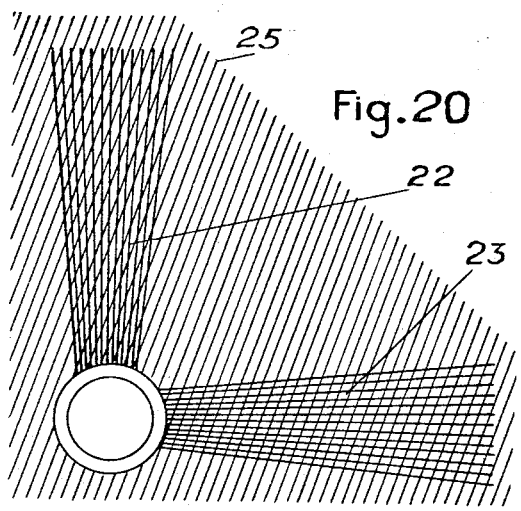
Figure 21:
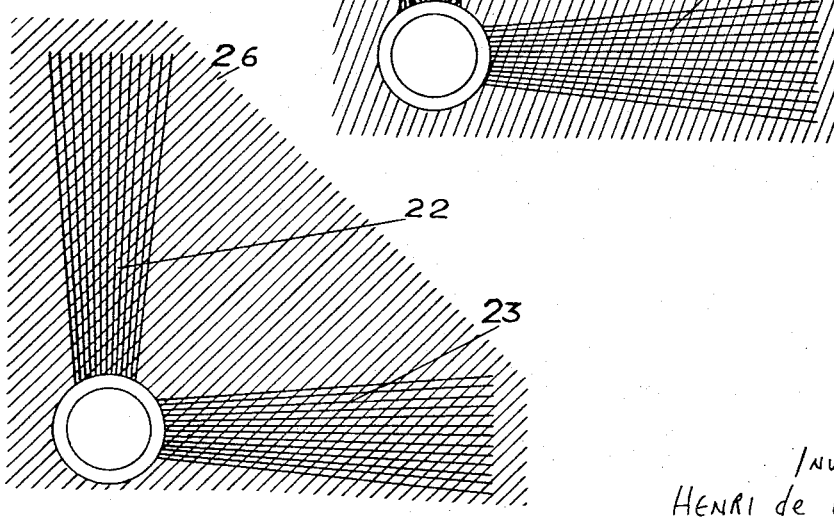

FIG. 18 shows, at a smaller scale than for FIG. 3, the colour dot pattern obtained with a screen with luminescent strips inclined at 45° to the horizontal, the larger dimension of the envelopes of the triads being at right angles to the direction of the strips, so not horizontal; and FIGS. 19, 20 and 21 show part of a definition test pattern obtained respectively with a vertical strip screen, with a screen with strips inclined at 70° to the horizontal, and with a screen with strips inclined at 45° to the horizontal.

Figure 1:
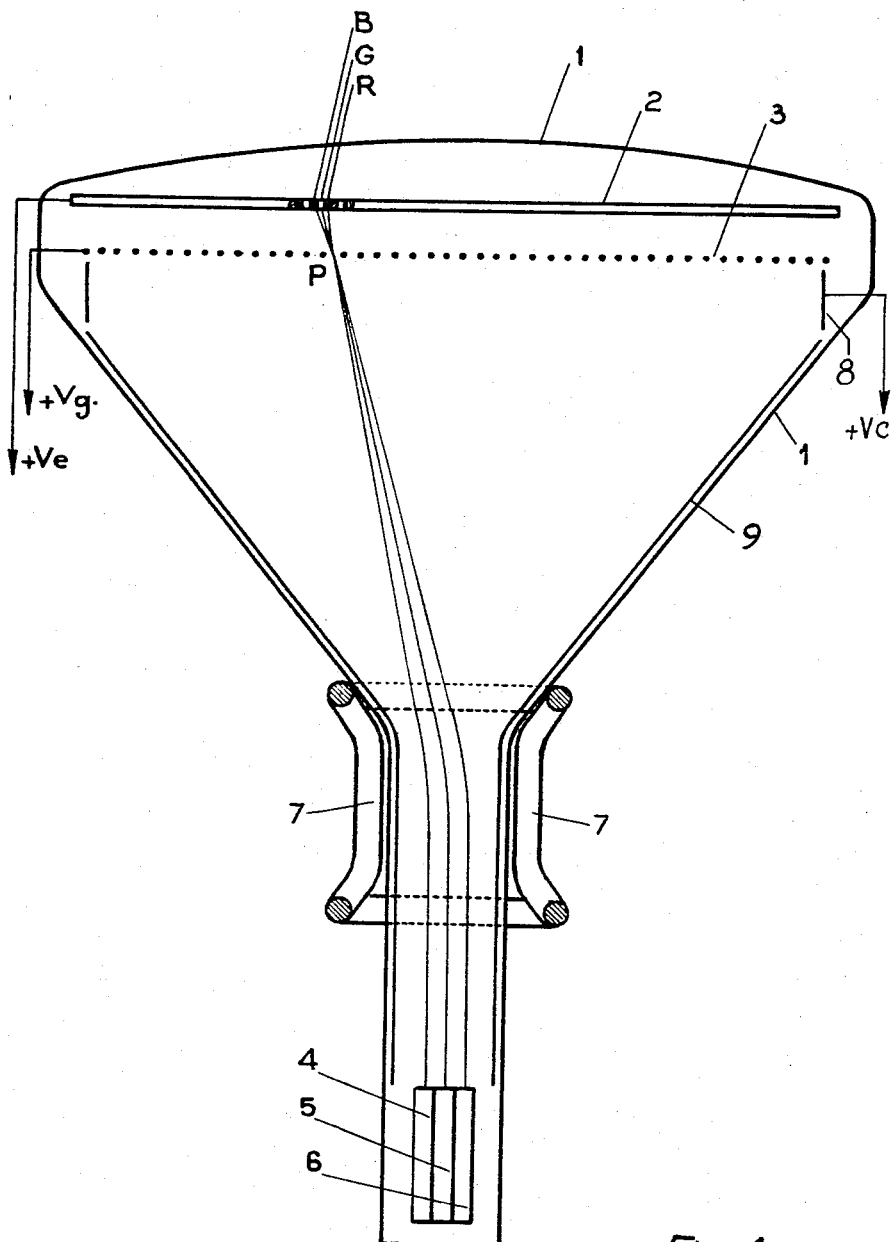
FIG. 1 shows diagrammatically a tricolour tube according to the invention.

FIG. 1 shows, highly diagrammatically and in axial horizontal section, a tube according to the invention, having an envelope 1.

A luminescent screen 2 is formed with adjacent parallel, successively red, green and blue phosphor strips R, G and B, three adjacent strips forming a triplet. These strips are inclined at 45° to the horizontal, as can be more clearly seen in FIG. 2.

The figure shows only a few phosphor strips whose dimensions have been exaggerated to make the figure clearer. Actually, the tube possesses a large number of triplets, each of which supplies an "image point" (formed by a triad comprising a red dot, a green dot and a blue dot) on each image line.

In front of screen 2 is a grid of very fine wires arranged in a direction parallel to the strips, and bounding the triplets. The distance of grid 3 from screen 2 is also much exaggerated in the figure.

Three electrostatically focused guns 4, 5 and 6, whose axes lie in the same horizontal plane, are so arranged that their beams converge at a point P situated approximately in the plane of grid 3.

This convergence of the three beams is obtained, for example, by means of very slightly different orientations of the axes of the three guns with respect to the tube axis and/or to electron optical devices (not shown), as is well known in the art.

Point P moves along successive horizontal lines under the action of the sweep voltages applied to an electromagnetic deflection system of which only coil 7 is visible in the figure.

The screen 2 is raised to a potential $V_e$, which is high compared to that of the cathodes of the guns, and grid 3 is raised to a lower positive potential $V_g$, the grid and screen assembly forming a system of convergent cylindrical lenses for the electron beams issuing from the guns. The conducting coating 9 on the internal wall of the tube, commonly known as the anode, is raised to the highest potential of the guns. The potential $V_g$ of the grid is equal to it.

Preferably, as shown in the figure, and as previously proposed in U.S. Patent No. 3,188,516, the grid-screen focusing system is associated with an auxiliary electrode 8 raised to a fixed potential $V_c$ higher than that of the grid, or preferably to a potential variable with the scanning so as to correct, at least partly, for the spurious deflection suffered by the beams in the grid-screen space due to the high field, essentially normal to the screen existing in this space, and which applies to the beams a generally parabolic deflection depending on the angle of incidence of these beams on the grid.

Electrode 8, here shown as a metal part surrounding the grid, may also consist of a conducting coat insulated from coat 9.

The tube shown in FIG. 1 operates as follows:

The beams from guns 4, 5 and 6 are respectively modulated by the red, green and blue signals. Through the combined action of the horizontal and vertical deflections, imposed by the deflection system, the convergence point P of the three beams moves horizontally along successive lines, and by suitable adjustment of the electron optical system of the tube, each beam strikes a strip of the colour to which it corresponds. The problem is essentially the same as in the case of a vertical strip tube and is solved in the same way.

FIG. 1 does not show the slight curvature (spurious deflection towards the tube axis) of the beams due to the grid-screen space field, nor the slight curvature in the opposite direction towards the electrode 8 of these beams in the region limited by electrode 8, which compensates, at least partly, for the above mentioned spurious deflection.

Figure 2:
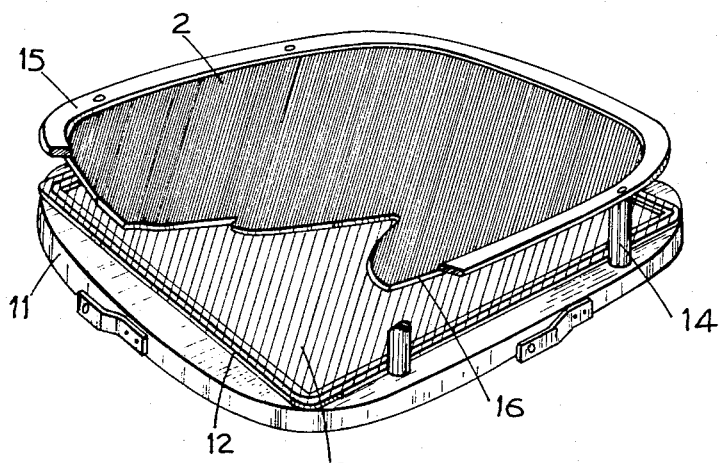
FIG. 2 shows in detail the grid-screen assembly of the tube shown in FIG. 1.

FIG. 2 shows the grid-screen unit 2–3 of the tube of FIG. 1.

In this figure, the support of grid 3 is shown at 11. Shown at 12 are rods soldered to support 11, the directions of these rods being parallel to the horizontal and vertical sides of the screen. The wires stretched at an angle of 45° with each rod forming the grid 3 are soldered to rods 12.

Insulating spacers 14 hold the luminescent screen at a constant distance from the grid. This screen 2 includes a glass plate 16 carrying the luminescent strips placed facing the grid and in a direction parallel to the grid wires, and a frame 15 fixed to spacers 14. This grid-screen unit is fitted to a known tube as known in the art, the external contours of the whole being identical to those of a conventional unit.

The above described tube thus acts essentially in the same way as a tube with vertical strips, but otherwise of the same type, and its fundamental value arises from the colour dot pattern obtained on the screen, as shown in the following figures which permit a comparison, all else being equal, of the colour dot patterns obtained on the one hand with a tube having a screen with vertical strips, and on the other hand with tubes having a screen with oblique strips; by this is meant strips making with the horizontal an acute angle definitely greater than 0° and definitely less than 90°.

Since the axes of the guns of the tube of FIG. 1 are arranged in the same horizontal plane, the spots of a given triad are aligned horizontally. By triad is meant the group of three dots of primary colours obtained simultaneously by the impact of the three beams respectively on the three strips of a triplet.

In this respect it is to be noted that it has been found useful to use guns arranged in the same horizontal plane in spit of the oblique direction of the strips. In this way the spots are more easily made to converge suitably at all points of the screen surface and a very satisfactory colour interlace is obtained in the horizontal direction, while the obliquity of the strips allows a colour interlace also in the vertical direction.

It should be noted that the use of three coplanar guns is obvious, but that this had practically been set aside in the case of tubes with a large angle of maximum deflection, as well as in the case of vertical strip tubes, on account of the fact that the distance between guns has to be too small in view of the width of the strip, as in the case of horizontal strip tubes, where the defect is the same for the three guns in one vertical plane.

Oblique strip screens offer an advantageous return in practice to three guns coplanar in the horizontal plane since, as will be seen later, they allow of a larger distance between the axes of the three guns for a given horizontal definition.

FIG. 3 shows, at a scale of 10, the colour dot pattern on a conventional screen with equal vertical strips 0.27 mm. wide, the pitch of the picture lines (determined by the height of the screen and the television standard for which the tube is used) being equal to 0.587 mm., a value corresponding to a screen of 34 cm. height and of the abovementioned 625 line standard, 579 of which are visible.

In this figure, as in those that follow, the vertical or oblique lines limit the strips, the horizontal lines, which have no real existence, corresponding to the central axis of the scanning lines.

To simplify the drawing, the colour dots are given a circular shape whereas, on account of the focusing action of the grid-screen unit with grid wires parallel to the strips, these spots are elongated, with the major axis parallel to the strips, this substantially increasing the "filling" of the screen with colour dots.

Further, again in order to simplify the drawing, spots of a single colour (e.g. red) are distinguished from spots of the other two colours by the use of black dots, the spots of the other colours being represented by small white circles. The vertical alignments are strikingly seen.

FIG. 4 is an enlargement to a scale of 50 (with respect to the actual case) of a smaller part of the same screen.

FIG. 4 shows the dots of the three colours—again shown in circular form—respectively by white circles, circles marked with a cross (+) and circles covered with a grating. FIGS. 5 and 6 correspond respectively to FIGS. 3 and 4 (same pitch of picture line, same strip width) but the strips being inclined at an angle $\theta = 45°$ to the horizontal.

It is at once seen that not only do the oblique monochrome alignments fail to strike the eye, but may even fail to be observed by a viewer not previously warned of their existence.

Another point observed by experience, which will now be discussed, is that picture definition is better with the screen of FIGS. 5 and 6 than with the screen of FIGS. 3 and 4, although there are less colour dots as a whole, this improvement being subjective in nature and in fact due to the dislocation of the vertical alignments of the triads.

The same applies to the colour dot pattern of FIGS. 7 and 8, respectively corresponding to the same hypotheses and numerical data as in the case of FIGS. 5 and 6, except that $\theta = 60°$.

In actual fact, at reasonable viewing distances, the viewer can apparently "integrate the horizontal definitions" supplied, depending on the distance, by two or three horizontal lines; in other words, these definitions "add," with the result that the screens of FIGS. 5 and 6, or 7 and 8, horizontal definition is definitely better than in the case of the screen of FIGS. 3 and 4.

This effect is shown in FIGS. 6 and 8 by dotted lines showing the projections of the "grated" spots of the first and third lines on the second.

Experience also shows that vertical definition, with the screens of FIGS. 5 and 7, is of the same order as with the screen of FIG. 3.

And this is obvious if it is accepted that vertical definition depends only on the number of picture lines, which remains unchanged, it being understood that vertical definition defined in this way has a meaning only when each line contains a sufficient number of image points.

On the whole, the vertical definition of the screen of FIGS. 5 and 7 is of the same order as that obtained from the screen of FIG. 3, whereas, as has been observed, the horizontal definition is much improved, resulting in substantial gain on "picture definition," such definition taking into account the special importance of horizontal and vertical lines in the actual world. The screens of FIGS. 5 and 7 possess a further advantage as against FIG. 3, for, designating by P the pitch of the picture lines, the arrangement shown in FIG. 3 leaves only the height P to take the major axis of the dots if one wishes to avoid partial overlap of one spot of a given colour relative to a picture line by a dot of the same colour appearing on the next picture line. With the screen of FIG. 5, and for the same pitch P of the picture lines, a length $P\sqrt{2}$ is available to take this major axis, and with that of FIG. 7 a length $P/\sin 60° = 2P\sqrt{3}$ is available. It is thus seen that one recovers, at least partly, the reduced filling of the screen by the dots, due to the reduced number of triads.

The screens of FIGS. 5 and 7 do not correspond to preconceived directives as regards the pitch of the scanning lines and the strip width, in view of the value of $\theta$.

It will now be shown how, by means of the screen according to the invention, and by a suitable choice of the relations between the various parameters, it is possible to obtain predictable dot patterns with useful features, either rigorously or approximately.

To simplify this description, FIG. 9, which illustrates part of the screen, shows only the central point M of each triad of three colour dots. Since all the triads are identical and identically oriented, the superposition of two points M by translation will bring about superposition of the corresponding triads. One can therefore reason first only on the basis of these points M, each being symbolized by a cross $(x)$. In what follows, the term "line" will designate the locus line of the points M obtained during one horizontal scanning of the screen.

This being so, FIG. 9 shows five successive points M of the line of rank $n$ (the rank being reckoned on the total picture and not on the field, in the case of interlaced scanning).

The direction of the luminescent strips has been shown by dotted lines at an angle $\theta$ with the horizontal.

In addition the figure shows the line of rank $(n+1)$ separated from the line of rank $n$ by an interval equal to P, where, as already stated, P is a quantity imposed by the height H of the screen, and by the standards of the colour television system for which the tube is being used.

It is clear that the points M of the line of rank $(n+1)$ will lie at the intersections of the dotted lines with the line of rank $(n+1)$, as shown in the figure.

On a given line, two successive points M are separated by T', where T', the "horizontal width" of a triplet, i.e. the width measured in the horizontal direction, is related to its true width T, i.e. measured in a direction normal to the strips, by the relation:

$$T' = T/\sin \theta \qquad (1)$$

as can be seen in FIG. 10 which shows three successive triplets, with the corresponding points M.

There is of course a relation of the same kind between the "horizontal" widths, $b'$ and "true" widths, $b$, of a strip;

$$b' = b/\sin \theta \qquad (2)$$

In addition, in the usual case here under consideration where the strips of different colours are of the same width, $$b = T/3; \quad b' = T'/3$$

This being so, point M of the line of rank $(n+1)$, obtained on the same luminescent strip as a point M of line $n$ (FIG. 9) is displaced from the latter, in the horizontal direction, by $$d = P/\tan \theta \qquad (3)$$

It is at once seen that for given values of P and T', the distribution of the triads, or, which comes to the same thing since all the triads are similarly oriented, the distribution of the dots of a given colour is determined by this value $d$, or again by the ratio $Q = d/T'$.

In view of the reduction of the number of dots per line for a given value of T, when $\theta$ decreases, the values of $d$ greater than T' (Q greater than 1) are less useful than values less than T' (Q less than 1).

Similarly, for a given value of T', a shift to the right of $d$ less than T', giving, from the picture point of view (with a different screen), the same results as a shift to the left of $T'-d$, the most useful values of $d$ to be considered are those which are at most equal to $T'/2$ (Q not greater than ½), the shift being equally either to the left (as in the figure) or to the right.

A distribution of colour dots will be said to have a vertical period of order $p$ ($p$ being a whole number) when the $(p+n)^{th}$ picture line of the pattern can be superposed on the $n^{th}$ line by vertical translation; this superposition of the two lines should bring about superposition of dots of the same colour. All that is then required is that points M (FIG. 9) be superposed.

A pattern (FIG. 9) with a vertical period of order 2 will be produced if $$d = T'/2 \text{ or } Q = \frac{1}{2} \quad (4)$$

that is to say if $$P/\tan \theta = T'/2 = T/(2 \sin \theta) \quad (5)$$

or $$2P = T' \tan \theta = T/\cos \theta \quad (6)$$

Such a triad pattern with a vertical period of order 2 has been shown in FIG. 11.

Returning to the notion of integration of the horizontal definitions of two successive picture lines, the pattern of FIG. 11 gives this integration a regularity which was not present in those of FIGS. 6 or 8, points M of the odd lines interlacing symmetrically half-way between those of the even lines.

This integration being secured, the horizontal definition is that corresponding to vertical triplets of true width $T = T'/2$, this result requiring oblique triplets of true width $T = T' \sin \theta = T'/\sqrt{2}$.

The pattern of FIG. 11 can be modified so that the vertical and horizontal definitions are identical.

For in FIG. 11 the lines are spaced by P, each being composed of points M spaced by T'.

There are also columns spaced by $T'/2$, each of which is composed of points M spaced by 2P.

So the triad pattern will be identical from the horizontal and vertical points of view if $$P = T'/2$$

and $$T' = 2P$$

These two conditions are identical. All that is required is that $2P = T'$.

But taking into account Relation 6, $2P = T' \tan \theta$, expressing that $d = T'/2$, it will be seen that $2P = T'$ requires that $\tan \theta = 1$, $\theta = 45°$.

Then $$T = T' \sin \theta = 2P \sin \theta = 2P\sqrt{2}/2 = P\sqrt{2}$$

and $$b = P\sqrt{2}/3$$

Which, for $P = 0.587$ mm., gives $$b = 0.276 \text{ mm.}$$

which is a strip width still possible to obtain.

FIGS. 12 and 13 show, at scales of 10 and 50 respectively, the dot patterns obtained with the strips inclined at 45°, and $b = P\sqrt{2}/3$, the assumptions and conventions, except for this relation between $b$ and P, being the same as for the case of FIGS. 5 and 6.

Comparison of these figures immediately shows the improved pattern of FIG. 12 (or 13) over that of FIG. 14 (or 15), in spite of the smaller number of dots.

Further, such a structure does not produce an impression of monochrome columns like that given by a vertical strip tube, among others, due to the fact of the greater vertical distance between two dots of the same column and also from the fact that dots of two colours overlap the columns of the third, this effect being much more pronounced then appears in FIG. 13, taking into account the elongated shape of the spots with the major axis parallel to the strips.

It is easily verified that it is possible to obtain a pattern with a vertical period of order P by the condition $$d = T'/p \quad (8)$$

adding to it identity of structures both horizontally and vertically by adding $$\theta = 45°$$

The value $p = 3$ provides a very satisfactory interlacing of the spots of each colour, due to the fact that (with strips of different colours of the same width, and with triads of three aligned spots) there will be produced compound columns of dots, each consisting of dots successively red, blue and green.

This gives, $T' = 3P/\tan \theta$; $b = (T' \sin \theta)/3 = P \cos \theta$.

Adding $\theta = 45°$ to secure identity of the triad pattern, in the horizontal and vertical directions, there will be in addition $$b = P/\sqrt{2} = 0.41 \text{ mm. (for } P = 0.587 \text{ mm.)}$$

It will be noted that patterns can be obtained with vertical periods of order $p$ without adding the refinement of the identity of the line and column structures, which then permits the use of strips with a higher slope, hence with a lower value of T', leading to a larger number of triads on the screen (but $b$ is lowered).

For a pattern with a vertical period of order 3 (with $d$ equal to $T'/3$) the only necessary condition is finally $b = P \cos \theta$.

If it is required to secure the largest number of dots compatible with a width $b$ reckoned to be easily obtained, all that is required is to make $\cos \theta = b/P$.

Taking, for example, $b = 0.3$ mm., and assuming P imposed as before at 0.587 mm., it follows $$\cos \theta = 0.511$$
$$\theta = 59°16'$$

For simplification, making $\theta = 60°$, the corrected value of $b$ becomes $$b = P \cos 60° = P/2 = 0.293$$

the total number of dots will be multiplied by $$\sin 60°/\sin 45° = \sqrt{3}/2 = 1.22$$

as compared to the case of the pattern of vertical period of order 3, with $\theta = 45°$. The horizontal and vertical definitions will no longer be equal, but this is the result of increased horizontal definition with no reduction of vertical definition.

FIGS. 16 and 17 show at a scale of 10 and 50 the dot patterns corresponding to these numerical data, with the same conventions as in the case of FIGS. 7 and 8.

It should be noted that the three quantities P, T' an $d$ are three independent quantities which perfectly define a triad pattern.

Then considering two patterns of the same respective values of P and T' and with the valve $d = d_1$ for one of them and $d = d_2$ not very different from $d_1$ for the other, the patterns will be similar.

For example, the value of making $d = T'/2$ has already been noted.

But $d = T'$ is of no value for horizontal definition (nor for monochrome alignments).

From the above remark, it can be deduced that patterns with $d$ differing only slightly from $T'/2$ will be useful, and that structures with $d$ differing only slightly from T' will not be useful; it may be added that patterns with $d$ very small as compared to T' will not be useful either; it would hardly be worth while making $d$ less than $T'/6$, for example.

It should be noted that one has to avoid too great a reduction of the total number of triads, in other words, too high a value of T'.

The shafts $d = T'/p$ have been examined.

Considering only shifts less than $T'/2$, one may also consider shifts $d = T' (r/p)$, with $r$ and $p$ whole numbers and prime to another, $r$ differing from 1, which, in a different way, lead to patterns with a vertical period of order $p$, like the shifts $T'/p$.

It will be noted that H being the height of the screen (this being of course the height of the useful part of the screen, i.e. that used in the reproduction of the picture) and N being the number of visible picture lines of the television standard for which the tube is used, there substantially obtains:

$$P = H/N$$

The ratio $d/T'$—which is so important for the triad pattern—can be written $$d/T' = (P/\tan \theta)/(T/\sin \theta) = (P \cos \theta)/T$$
$$= (H \cos \theta)/N.T = (1/N).(H \cos \theta)/T$$

where $(H \cos \theta)/T$ depends only on the screen.

To the special values Q of the ratio $d/T'$ considered above there thus correspond values $q = N.Q$ of the ratio $(H \cos \theta)/T$ characteristic of the screen.

The colour dot patterns of FIGS. 5 to 8, 12 and 13, 16 and 17, correspond, as already stated, to the case of three guns whose axes lie in the same horizontal plane, but the invention is not restricted to this case and is applicable to other gun arrangements.

In particular, it is possible to adapt to a screen whose strips make an angle $\theta$ with the horizontal, any three-gun tube designed for operating with a screen with vertical strips by rotating through $90° - \theta$ in the appropriate direction the whole of the arrangement which, for a given image point, ensures simultaneous impact of the beams from the three guns respectively on the three strips of the triplet to which this image point corresponds, the arrangement for scanning the screen by successive lines retaining its usual orientation.

If the strips are inclined at 45° the rotation will be of 45°.

It should be noted that for the reason mentioned above, little use is made, in conventional tubes with vertical strip screens, of three guns whose axes lie in the same horizontal plane, when the strip width becomes sufficiently small. The axis of the central gun is then generally offset in height with respect to those of the other two. In this way, in the absence of correction, the central point of each triad would be offset, to scale, in height with respect to the other two, the centres of the three points then forming a triangle.

In actual fact, the alignment of the three points of each triad is generally part of the normal "convergence corrections," which ensure correct relative positioning of the three primary colour pictures.

The same factor is operative with an oblique strip tube by the abovementioned adaptation of a vertical strip tube, since the same true strip width will be obtained in a direction parallel to the plane containing the axes of the two lateral guns.

So in general there will be an offset of the axis of the central gun with respect to the plane of the axes of the two lateral guns, the alignment of the triads being reestablished as in the case of a vertical strip tube.

FIG. 18 shows at a scale of 20 the colour dot pattern obtained with an arrangement resulting from the above adaptation of a vertical strip tube, with three guns with non-coplanar axes, as shown above, the points of each triad being aligned, an alignment which will be retained in the adapted tube with an oblique strip screen.

The characteristics of the screen of FIG. 18 are as follows:

|  | Mm. |
|---|---|
| Picture line pitch | 0.5 |
| Strip width | 0.4 |

It should be noted that the representation of FIG. 18 corresponds to the numerical ratio mentioned between the pitch of the scanning lines and the pitch of the triplets, and that the pattern can be varied by altering this ratio.

The example of FIG. 18 corresponds to a practical mode of realization which ensures satisfactory results. It is of course possible to use, for triads oriented in this way, the triad patterns proposed for triads formed of three horizontally aligned dots.

While this mode of realization of the tube according to the invention does not possess some of the advantages obtained with three guns whose axes lie in the same horizontal plane, it possesses others: if the strips are inclined at 45° to the horizontal, the dots of a given triad are also aligned at 45° to the horizontal, and this eases subjective fusion by the viewer of dots of a given triad as compared to the case when the latter are aligned horizontally, since eye discrimination is less in the case of oblique lines.

It should be noted that in the case for which the three dots of a triad are aligned horizontally—an arrangement which can be obtained not only with three guns whose axes lie in the same horizontal plane, but also with a central gun offset in height relatively to the other two, and realignment of the dots of each triad—the horizontal monochrome alignments generated by each beam, taken separately, are interlaced with those generated by the two other beams. There is thus no risk of reestablishing, in the horizontal direction, the alignments of monochrome dots which were suppressed in the vertical direction.

When the three spots of a triad have another relative orientation (case of FIG. 18) each beam, during horizontal scanning of the screen, supplies spots of a given colour situated in a horizontal "geometric band." This of course does not refer to a luminescent strip. But on the one hand this does not lead to the horizontal luminous strip pattern of horizontal strip tubes. On the other hand, overlaps generally arise between the geometric bands mentioned above.

This overlap effect is most marked in FIG. 18 for the lateral dots of each triad, but much less so for the central dots of the triads. Here again the elongated shape of the colour dots with the major axis parallel to the strips, due to the focusing action of the grid-screen unit plays a non-negligible part in breaking up the monochrome horizontal lines generated by a beam considered separately.

FIGS. 19 to 21 show the improvement obtained with a screen with distinctly oblique strips, as regards interference patterns on rectilinear portions of an image.

FIG. 19 shows a screen with vertical phosphor strips 21 by means of which is reproduced a part of an optical test pattern consisting of a set of bars 22, with a vertical axis, and a set of bars 23, with horizontal axis, as from a circle of origin. To make the drawing clearer, the test pattern bars, increasing in thickness from the circle are shown only by their respective axes. The sets are convergent to permit appreciation of a limit of definition with a single group of lines; it will be seen that the vertical monochrome alignment of a vertical strip screen interfere with the lines of the set with the vertical axis, and this produces interference patterns which are troublesome for the viewer. The set with the vertical axis intercepts much less luminescent strips than the horizontal set.

In FIG. 20, which shows the same elements, but with a screen 25 with luminescent strips inclined at 70° to the horizontal, the interference is less troublesome. The numbers of strips intercepted by the sets are less different.

In FIG. 21, where the same elements are shown with a screen 26 with its luminescent strips at 45° to the horizontal, no interference is noticed; also, the number of luminescent strips intercepted by the two sets are identical, which gives a more uniform aspect to the test pattern.

FIGS. 19 to 21 thus bring out one aspect of the improvements obtained by the use of oblique luminescent strips, improvements which should be appreciated in view of the importance, in the physical world, of horizontal and vertical lines.

The invention has been described for the preferred case of a tube with a grid with wires parallel to the strips, the latter having of course to be inclined at the same angle to the horizontal as the strips, but it is not restricted to this particular case.

Of course, the same acute angle $\theta$ may be obtained with two directions of the strips symmetrical with respect to the vertical direction, one leading to a shift $d$ towards the left, and the other to a shift $d$ towards the right.

What is claimed is:

1. A colour television image reproducing arrangement including a tube, said tube comprising a screen with parallel phosphor strips, three successive strips of said screen having respective three colours and forming a triplet having a width T, said strips making with the horizontal direction of said screen an acute angle $\theta$ between 40° and 70°, and said screen being dimensioned to give a picture having a height H, the values of T, H and $\theta$ being such that the ratio $q=(H \cos \theta)/T$ is substantially equal to $N/2$ where N is the number of visible picture lines of a colour television standard; three guns for producing three beams respectively associated with said three colours; and means for causing each of said beams to strike the strips of the colour associated therewith.

2. A colour television image reproducing arrangement including a tube, said tube comprising a screen with parallel phosphor strips, three successive strips of said screen having respective three colours and forming a triplet having a width T, said strips making with the horizontal direction of said screen an acute angle $\theta$ between 40° and 70°, and said screen being dimensioned to give a picture having a height H, the values of T, H and $\theta$ being such that the ratio $q=(H \cos \theta)/T$ is substantially equal to $N/3$ where N is the number of visible picture lines of a colour television standard; three guns for producing three beams respectively associated with said three colours; and means for causing each of said beams to strike the strips of the colour associated therewith.

3. A colour television reproducing arrangement including a tube, said tube comprising a screen with parallel phosphor strips, three successive strips of said screen having respective three colours and forming a triplet having a width T, said strips making with the horizontal direction of said screen an acute angle $\theta$ between 40° and 70°, and said screen being dimensioned to give a picture having a height H, the values of T, H and $\theta$ being such that the ratio $q=(H \cos \theta)/T$ is between $N/2$ and $N/3$ where N is the number of visible picture lines of a colour television standard; three guns for producing three beams respectively associated with said three colours; and means for causing each of said beams to strike the strips of the colour associated therewith.

References Cited
UNITED STATES PATENTS

| | | | |
|---|---|---|---|
| 2,457,415 | 12/1948 | Sziklai | 178—5.4 |
| 2,612,614 | 9/1952 | Amdursky et al. | 313—92 |
| 2,701,821 | 2/1955 | Alexanderson | 178—5.4 |
| 2,747,134 | 5/1956 | Allwine | 313—92 X |
| 2,795,720 | 6/1957 | Epstein et al. | 313—92 X |
| 2,864,032 | 12/1958 | Amdursky et al. | 313—92 X |

ROBERT SEGAL, *Primary Examiner.*
JAMES W. LAWRENCE, *Examiner.*